United States Patent
Sandstrom et al.

(10) Patent No.: US 8,460,494 B2
(45) Date of Patent: Jun. 11, 2013

(54) TIRE WITH TREAD AND PREPARATION THEREOF

(75) Inventors: Paul Harry Sandstrom, Cuyahoga Falls, OH (US); George Frank Balogh, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 392 days.

(21) Appl. No.: 12/836,600

(22) Filed: Jul. 15, 2010

(65) Prior Publication Data

US 2012/0012236 A1     Jan. 19, 2012

(51) Int. Cl.
*B60C 1/00* (2006.01)
*B60C 11/00* (2006.01)
*B29D 30/08* (2006.01)

(52) U.S. Cl.
USPC ............... 156/110.1; 156/123; 156/128.6; 152/209.5; 152/209.6

(58) Field of Classification Search
USPC ............... 152/209.5, 209.6; 156/110.1, 123, 156/128.6
See application file for complete search history.

(56) References Cited

U.S. PATENT DOCUMENTS

| 5,174,838 | A  |   | 12/1992 | Sandstrom et al. | ....... | 152/209 R |
| 5,284,195 | A  |   | 2/1994  | Sandstrom et al. | ....... | 152/209 R |
| 5,997,673 | A  | * | 12/1999 | Sandstrom et al. | ........ | 156/110.1 |
| 6,426,378 | B1 | * | 7/2002  | Lickes et al. | ................... | 524/262 |
| 6,588,471 | B2 | * | 7/2003  | Majumdar et al. | ......... | 152/209.6 |

* cited by examiner

*Primary Examiner* — Steven D Maki
*Assistant Examiner* — Robert Dye
(74) *Attorney, Agent, or Firm* — Henry C. Young, Jr.

(57) ABSTRACT

This invention relates to a pneumatic rubber tire having a rubber tread of a cap/base construction. More specifically, the invention relates to a tire having a tread with minimized, or inhibited, base peaking.

16 Claims, 4 Drawing Sheets

TIRE WITH TREAD AND PREPARATION THEREOF

FIELD OF THE INVENTION

This invention relates to a pneumatic rubber tire having a rubber tread of a cap/base construction. More specifically, the invention relates to a tire having a tread with minimized, or inhibited, base peaking.

BACKGROUND OF THE INVENTION

Base peaking often occurs in an uncured rubber tread of a cap/base construction by an intrusion of a tread base rubber layer underlying an outer tread cap rubber layer into and within the outer tread cap rubber layer during the molding and curing of the tire tread in a tire mold. Base peaking occurs when the underlying uncured tread rubber layer flows into and within the lug portions of the uncured outer tread cap rubber layer as the tread rubber flows during the shaping and curing of a green, unvulcanized rubber tire in a tire mold at an elevated temperature and pressure. Such base peaking is well known to those having skill in such art.

Sometimes it is desired to minimize, by inhibiting or retarding, excessive base peaking in a tire tread.

Where a green, or uncured, rubber tire is inserted in a suitable tire mold under conditions of elevated temperature and pressure to shape and cure, or vulcanize, the tire, the uncured outer tread rubber layer flows into depressions in the mold cavity to create shaped tire tread lugs.

In practice, the underlying uncured rubber layer can physically flow together with the outer uncured rubber layer into the mold cavity to intrude into and within the formed tread lugs of the outer tread rubber layer. Such intrusion of the underlying tread rubber layer into and within the lugs of the outer tread rubber layer is sometimes referred to as "base peaking". As indicated, this phenomenon is well known to those having skill in such art.

It is sometimes desired to retard such base peaking in the formative tread shaping and curing operation and to therefore minimize the resulting base peaking profile, or configuration, of the underlying tread rubber layer in the finalized cured tire tread.

In one aspect, it is to be appreciated that the viscosity (e.g. Mooney viscosity) of the uncured underlying rubber tread layer may be increased to resist its flow together with the outer tread rubber layer into the mold cavities with conventional compounding ingredients, such as, for example, by increasing its carbon black content. However, it is considered that such technique of increasing carbon black content tends to defeat the overall concept of such underlying tread rubber layer because it tends to increase the hysteresis of the rubber composition which typically promotes greater internal heat generation within the tire tread, and thereby higher running temperature, as the tire is being run and, further, may also promote poorer rolling resistance for the tire tread and thereby an associated reduced fuel economy for the associated vehicle.

Historically, inclusion of high crystallinity trans 1,4-polybutadiene and high crystallinity trans 1,4-polyisoprene polymers in such underlying tread rubber layer has been suggested to increase its uncured rubber viscosity and thereby reduce, or minimize, its flow with the uncured outer tread rubber layer into the configured tire mold cavity to reduce its base peaking profile during the shaping and molding of the tire tread. For example, see U.S. Pat. Nos. 5,174,838 and 5,284,195.

Use of such high crystallinity polymers has been observed as being useful in retarding base peaking because they are in a nature of thermoplastic resins in their uncured state at room temperature by virtue of their high crystallinity. Because they contain many double bonds in their polymer backbone, they can, however, be suitably blended and co-cured with elastomers contained in the rubber composition of the underlying rubber tread layer. Such inclusion of the high crystallinity polymers can create sufficient viscosity in the uncured tread base rubber composition to resist the aforesaid base peaking effect of the tread base rubber layer into the outer tread cap rubber layer, particularly into its tread lugs, during the tire molding operation.

However, for this invention, an entirely different approach is evaluated for resisting base peaking. Use of high crystallinity trans 1,4-polymers is not a focus of this invention.

For this invention, it is desired to evaluate a possibility of partially pre-curing the rubber composition of the underlying tread rubber layer to modify its morphology, in a sense of significantly and prematurely increasing its viscosity, by use of a technique which is believed to be novel and a dramatic change from past practice which is therefore considered to be worthy of evaluation for resisting or retarding and thereby minimizing the base peaking and to provide a tread of cap/base construction with a minimization of base peaking configuration within the tire tread.

In particular, it is desired to evaluate providing a rubber tire tread strip in a form of a co-extruded laminate comprised of two rubber layers, where the tread strip is comprised of a first uncured tire tread outer rubber layer and a second partially cured tire tread underlying rubber layer where said underlying rubber layer underlies (and is therefore next to and in contact with) said first uncured rubber layer.

For this evaluation, it is envisioned that the underlying tread rubber layer becomes partially cured during the rubber co-extrusion process by providing its rubber composition, as what might be termed as being a scorchy rubber composition, characterized by having a time for a T+5 Mooney viscosity rise at 121° C. in a range of from about 5 to about 20 minutes (a relatively short time) and at least 5 minutes less than the time for a time for a T+5 temperature rise at 121° C. for the rubber composition of the tire tread outer rubber layer.

It is envisioned that the rubber extrusion temperature, for the rubber extrusion process, may be, for example, in a range of from about 90 to about 130° C. with a residence extrusion time being sufficient to partially pre-cure the tire tread underlying rubber layer by the extrusion process (e.g. within the extruder) and with a minimal, if any, pre-curing of the rubber composition of the tire tread outer rubber layer.

The co-extruded tread rubber strip is then built as a circumferential tread into an assembly of a plurality of uncured rubber components and the assembly molded in a suitable tire mold at an elevated temperature and pressure to form a cured tire with the outer tread rubber layer having a lug and groove molded configuration and an intended minimal, if any, base peaking of the underlying tread rubber layer into and within the lugs of the outer tread rubber layer.

In the description of this invention, the terms "rubber" and "elastomer" where used, are used interchangeably, unless otherwise prescribed. The terms "rubber composition", "compounded rubber" and "rubber compound", where used, are used interchangeably to refer to "rubber which has been blended or mixed with various ingredients" and the term "compound" relates to a "rubber composition" unless otherwise indicated. Such terms are well known to those having skill in the rubber mixing and rubber compounding art.

In the description of this invention, the term "phr" refers to parts of a respective material per 100 parts by weight of rubber, or elastomer. The terms "cure" and "vulcanize", where used, may be used interchangeably unless otherwise indicated.

SUMMARY OF THE INVENTION

In accordance with this invention, a tire tread rubber strip for a tire is provided as a co-extruded laminate comprised of two rubber layers, wherein said rubber layers are comprised of a first uncured tire tread outer rubber layer and a second partially cured tire tread underlying rubber layer where said underlying rubber layer underlies (and is therefore next to and in contact with) said first uncured rubber layer.

In further accordance with this invention, an uncured rubber tire is provided having said tread strip as a circumferential tread component of a tire assembly of a plurality of uncured rubber components.

In additional accordance with this invention, a mold-cured tire is provided comprised of said tire assembly cured (e.g. sulfur cured) in a tire mold.

In further accordance with this invention, a method is provided which comprises applying said tire rubber tread strip as a circumferential tread component of a tire assembly comprised of a plurality of uncured rubber components and the assembly then molded in a suitable tire mold at an elevated temperature and pressure to form a cured rubber tire with a cured rubber tread with its outer tread rubber layer having a molded lug and groove configuration and where said tread has a minimized (e.g. retarded, inhibited and thereby minimal, if any) base peaking of said underlying tread rubber layer into and within the lugs of the outer tread rubber layer.

In additional accordance with this invention, a tire is provided as being prepared thereby.

In further accordance with this invention, said second rubber layer is comprised of a rubber composition characterized in its uncured state by having time for a T+5 Mooney viscosity rise property at 121° C. in a range of from about 5 to about 20, alternately from about 5 to about 10, minutes (a relatively short period of time);

wherein said first rubber layer is comprised of a rubber composition characterized in its uncured state by having time for a T+5 Mooney viscosity rise property at 121° C. in a range of from about 20 to about 60, alternately from about 30 to about 50, minutes;

wherein the time for said T+5 Mooney viscosity rise property of the uncured rubber composition of said second rubber layer is at least 5, alternately at least 10, minutes less than time for said T+5 Mooney viscosity rise property of the rubber composition of said first rubber layer.

In one embodiment, a method of preparing said tire tread rubber strip comprises co-extruding (in a rubber composition extruder) rubber compositions comprised of first and second rubber compositions through a die to form said tread rubber strip as a co-extruded laminate comprised of two rubber layers comprised of said first rubber composition as an uncured tire tread outer rubber layer and second rubber composition as a partially cured tire tread underlying rubber layer where said underlying rubber layer underlies (and is therefore next to and in contact with) said tire tread outer rubber layer;

wherein said second rubber composition becomes partially cured during said co-extrusion process;

wherein said second rubber composition is characterized by having time for a T+5 Mooney viscosity rise property at 121° C. in a range of from about 5 to about 20, alternately from about 5 to about 10, minutes (a relatively short period of time);

wherein said first rubber composition is characterized by having time for a T+5 Mooney viscosity rise property at 121° C. in a range of from about 20 to about 60, alternately from about 30 to about 50, minutes;

wherein the time for said T+5 Mooney viscosity rise property of said second rubber composition is at least 5, alternately at least 10, minutes less than the time for said T+5 Mooney viscosity rise property of said first rubber composition.

In practice, said method of extrusion process is preferably conducted in a temperature (for the rubber compositions) in a range of from about 90 to about 130° C. and for a sufficient period of time to partially cure said second rubber composition without curing said first rubber composition. By partially curing (e.g. partially pre-curing) said rubber composition, it is meant that crosslinking of the rubber(s) to effectively increase the viscosity of the rubber composition such that flow of the rubber composition during the curing process in the tire mold is minimized.

In further accordance, a tire tread rubber strip is prepared by said method.

In additional accordance with this invention, said method further comprises applying said co-extruded tread rubber strip as a circumferential tread component of a tire assembly comprised of a plurality of uncured rubber components and the assembly then molded in a suitable tire mold at an elevated temperature and pressure to form a cured rubber tire having a cured rubber tread (cured tread rubber strip) with its outer tread rubber layer having a molded lug and groove configuration and where said tread has a minimized (e.g. retarded, or inhibited, and therefore minimal, if any) base peaking of the underlying tread rubber layer into and within the lugs of the outer tread rubber layer.

In further accordance with this invention, a tire is provided prepared by said method.

In additional accordance with this invention, a tire is provided having a circumferential rubber tread comprised of an outer uncured rubber layer and underlying partially pre-cured underlying rubber layer, wherein said underlying rubber layer underlies and is adjacent to said uncured outer rubber layer (said pre-cured rubber layer underlying and next to, or juxtapositioned to), said uncured outer tread rubber layer), wherein said partially pre-cured rubber composition of said underlying rubber layer is characterized by having a time for a T+5 Mooney viscosity rise property of 5 viscosity units at 121° C. in a range of from about 5 to about 20, alternately from about 5 to about 10, minutes, wherein said uncured rubber composition of said outer tread rubber layer is characterized by having a time for a T+5 Mooney viscosity rise property of 5 viscosity units at 121° C. in a range of from about 20 to about 60, alternately about 30 to about 50, minutes, and wherein time for the T+5 Mooney viscosity rise property of the rubber composition of said uncured underlying tread rubber layer is at least 5, alternately at least 10, minutes less than the time for the T+5 Mooney viscosity rise property of said uncured tread outer rubber layer, thereby indicating a significantly higher rate of cure for the uncured rubber composition of underlying rubber layer.

In further accordance with this invention, a tire is provided with a tread having a cap/base construction comprised an outer tread cap rubber layer of a lug and groove configuration and an underlying tread rubber layer (adjacent to said outer tread cap layer), wherein said tread is comprised of a laminate of a co-vulcanized combination of an outer tread cap uncured rubber layer and underlying partially pre-cured tread rubber layer.

In additional accordance with this invention, said partially pre-cured rubber composition of said underlying rubber layer is provided by partially pre-curing an uncured rubber composition characterized by having a time for a T+5 Mooney viscosity rise property of 5 viscosity units at 121° C. in a range of from about 5 to about 20, alternately from about 5 to about 10, minutes.

In practice, the rubber composition of said underlying tread rubber layer may be comprised of, based on parts by weight ingredient per 100 parts by weight rubber (phr), (A) 100 phr of at least one conjugated diene-based elastomer, exclusive of trans 1,4-polybutadiene and trans 1,4-polyisoprene polymers and isobutylene-based copolymers, wherein said conjugated diene-based elastomer is comprised of at least one of cis 1,4-polyisoprene rubber (natural or synthetic cis 1,4-polyisoprene rubber), isoprene/butadiene copolymer rubber, cis 1,4-polybutadiene rubber and styrene/butadiene rubber, preferably a combination of cis 1,4-polyisoprene rubber and cis 1,4-polybutadiene rubber;

(B) sulfur accelerated vulcanization system comprised of:
(1) sulfur,
(2) primary sulfur vulcanization accelerator, and
(3) optionally, a secondary sulfur vulcanization accelerator;

wherein said uncured rubber composition of said underlying tread rubber layer is characterized by having time for a T+5 Mooney viscosity rise property of 5 viscosity units at 121° C. in a range of from about 5 to about 20, alternately from about 5 to about 10, minutes.

In the practice of this invention, the uncured rubber composition of said underlying tread rubber layer desirably has a time for a T+5 Mooney viscosity rise property of at least 5, alternately at least 10, minutes less than the time for the T+5 Mooney viscosity rise property of said uncured tread outer rubber layer.

The indicated sulfur may be free sulfur or sulfur provided by a sulfur donor or combination of sulfur donor and sulfur, wherein said sulfur donor releases free sulfur at an elevated temperature. Such sulfur donor may be comprised of, for example, at least one of alkylphenoldisulfide and 4,4'-dithiodimorpholine.

In a first alternate embodiment, said sulfur accelerated vulcanization system for said rubber composition of said underlying tread rubber layer is comprised of:
(A) sulfur
(B) primary sulfur vulcanization accelerator exclusive of sulfur vulcanization retarder, and
(C) optionally a secondary sulfur vulcanization accelerator.

In a second alternate embodiment of the invention, said sulfur accelerated vulcanization system for said underlying tread rubber composition is comprised of:
(A) sulfur
(B) primary, and optionally secondary, sulfur vulcanization accelerator exclusive of sulfur vulcanization retarder
(C) and, optionally, cross-linking agent comprised of at least one of
(1) metaphenylenebismaleimide, and
(2) organoperoxide.

In a third alternate embodiment of the invention, the rubber composition of said underlying tread rubber layer further contains a resin of an in situ reaction product of a methylene donor and methylene acceptor.

The T+5 viscosity scorch value of the tread base rubber composition is used to describe the time, in minutes, for which the rubber composition increases 5 Mooney viscosity units at a temperature of 121° C.

As indicated, in one embodiment of the invention and in contrast to the underlying tread rubber layer rubber composition, the time for the T+5 Mooney viscosity unit rise of 5 Mooney viscosity units of the tread cap rubber composition may desirably be in a range of from about 20 to about 60, alternately about 30 to about 50, minutes at a temperature of 121° C.

The term "scorch" or "scorchy" is used herein to relate to a rubber composition which has a tendency to cure, or vulcanize, at a significantly faster rate at a specified temperature range than is normally desirable for shaping and vulcanizing of the rubber composition in a suitable mold at an elevated temperature. In practice, an uncured rubber composition having a time for a T+5 Mooney viscosity unit rise in a range of from about 5 to about 20, alternately from about 5 to about 10, minutes is considered herein as being scorchy for most purposes In general, a rubber composition having a time for a T+5 Mooney viscosity rise in a range of from about 20 to about 60, alternately from about 30 to about 50 minutes at 121° C. would be suitable for use as tread rubber layer underlying the outer tread cap rubber layer for most purposes because it would normally be suitable for processing by extrusion prior to intended vulcanization in a tire mold at an elevated temperature without significant risk of pre-curing the rubber composition.

That is why the practice of this invention is considered to be a significant departure from past practice.

Accordingly, it is a significant aspect of this invention that the rubber composition for the underlying tread rubber layer is partially cured, or crosslinked, prior to the molding and shaping of the tire, including the curing of its tread, namely tread's outer tread cap rubber layer and partially pre-cured underlying tread rubber layer at an elevated temperature.

For this invention, the increase in Mooney viscosity and the associated time to reach said viscosity of an uncured rubber composition can be measured utilizing a Mooney Shearing Disc Viscometer, a measurement well known to those having skill in such art. For the Mooney viscosity using the Mooney Shearing Disk Viscometer, reference may be made to ASTM D1646 or DIN 53523.

In the practice of the invention, representative of said primary sulfur cure accelerators are, for example cyclohexylbenzothiazole sulfenamide, dicyclohexylbenzothiazole sulfenamide and N-tert-butyl-2-benzothiazolesulfenamide.

In the practice of the invention, representative of said secondary sulfur cure accelerators are, for example: tetramethyl thiuram disulfide, tetramethyl thiuram monosulfide, zinc dimethyldithiocarbamate, tetraisobutyl thiuram disulfide, tetraisobutyl thiuram monosulfide, tetrabenzyl thiuram disulfide, zinc dibenzyldithiocarbamate, diphenylguanidine, and di-o-tolyguanidine.

Said sulfur for said sulfur vulcanization accelerated vulcanization system may be free sulfur or sulfur from a sulfur donor compound, for which the sulfur donor compound might be referred to herein as a sulfur cure promoter, which releases free sulfur in situ within the rubber composition at an elevated temperature. Representative of such sulfur donors are, for example, alkylphenoldisulfide and 4,4'-dithiodimorpholine. In practice, tetramethylthiuram disulfide and tetraethylthiuram disulfide, while considered as being secondary sulfur vulcanization accelerators in a sense of promoting activation of thiazole accelerators (e.g. mercaptobenzothiazole and benzothiazyl disulfide) and sulfenamide sulfur accelerators, they also liberate free sulfur, although they are referred to herein as secondary sulfur cure accelerators.

In practice, representative of sulfur cure retarder to be excluded from said sulfur cure system is, for example, N-cyclohexyl thiophthalimide and phthalic anhydride.

A significance of use of said metaphenylenebismaleimide cross-linking agent in combination with a primary and, optionally, secondary sulfur vulcanization accelerator, is that it can cross-link the elastomers, particularly said isoprene-containing elastomers such as, for example, cis 1,4-polyisoprene elastomer, independently of said primary and secondary sulfur accelerators.

A significance of use of said organoperoxide cross-linking agent in combination with a primary and, optionally, secondary, sulfur vulcanization accelerator, is that it can cross-link conjugated diene-based elastomers.

In practice, representative of said organoperoxides are, for example: dicumyl peroxide, n-butyl 4,4-di-(tert-butylperoxy) valerate, 2,5-bis(t-butyl peroxy)-2,5-dimethyl hexane, 1,1-di-t-butyl peroxy-3,3,5-trimethyl cyclohexane, 2,5-dimethyl-2,5-di(t-butyl peroxy) hexane-3, p-chlorobenzyl peroxide, 2,4-dichlorobenzyl peroxide, 2,2-bis-(t-butyl peroxy)-butane, di-t-butyl peroxide, and benzyl peroxide, of which the dicumyl peroxide and n-butyl 4,4-di-(tert-butylperoxy) valerate may be preferred.

In practice, a significance of use of said optional resinous reaction product of methylene donor and methylene acceptor in combination with said primary, and optional secondary sulfur cure accelerators, is to add a stiffening property to the uncured rubber composition for said underlying rubber layer.

For said resinous reaction product of a methylene donor and methylene acceptor compound formed in situ within the rubber composition (formed from the reaction of said methylene donor and methylene acceptor within the rubber composition), said methylene donor may be, for example, at least one of hexamethoxymethylmelamine, hexaethoxymethylmelamine, ethoxymethylpyridinium chloride, N,N'N"-trimethylolmelamine, N-methylolmelamine, N',N"-dimethylolmelamine and hexamethylenetetramine. Said methylene acceptor compound may be, for example, at least one of resorcinol, resorcinol monobenzoate, phenolic cashew nut shell oil resin and polyhydric phenoxy resin.

For example, the methylene donor may be hexamethoxymethylmelamine or hexaethoxymethylmelamine and said methylene acceptor may be resorcinol, resorcinol monobenzoate or phenolic cashew nut oil resin.

In practice, said underlying rubber layer is exclusive of said trans 1,4-polybutadiene polymer and trans 1,4-polyisoprene polymer rubber viscosity building (promoting) additives, particularly since this invention does not rely upon and is not based upon use of such high crystallinity containing polymers to increase the rubber viscosity of the underlying tread rubber composition.

A significant aspect of the invention is to control the cure behavior of the rubber composition for the said underlying rubber layer in that it first partially cures during an extrusion process at an elevated temperature such as, for example, in a range of from about 115 to about 125° C. and thereafter fully cures in the tire mold at an elevated temperature in a range of about 140 to about 190° C. after being built into the tire assembly in the form of the underlying tread rubber layer This is considered herein as being significant in the sense of being able to significantly retard, or minimize, its base peaking into the outer tire cap rubber layer during the tire curing process subsequent to the extrusion of the rubber composition.

In practice the scorch promoting tread base rubber composition is used to reduce the T+5 time value (reduce the minutes to achieve the T+5 state of cure and thus increase the rate of cure) of the rubber composition which, in turn, minimizes its flow and resultant base peaking into the outer tread cap rubber layer which has a significantly greater T+5 time value (significantly slower cure rate in the sense of increased minutes to achieve its T+5 state of cure).

By this method, then, the integrity of the tread layer profile created by the rubber extrusion process is substantially maintained during the tire curing process in the tire mold.

Therefore, a further aspect of this invention is directed to a method of preparing a pneumatic rubber tire with a tread of cap/base construction which comprises shaping and curing an uncured pneumatic rubber tire in a mold by pressing said tire outwardly against a mold surface under conditions of heat and pressure to cause at least the tread rubber of said tire to flow and cure against said mold surface, to form a tread having a configuration composed of a combination of lugs and grooves with an improvement which comprises providing said tread underlying rubber layer (e.g. a tread base layer or tread intermediate rubber layer) composition with said scorch promoting behavior.

Further, the inclusion of the scorch promoting behavior in the rubber composition of the underlying tread rubber layer to modify its T+5 cure rate and thereby prematurely increase its viscosity (prematurely pre-curing of the rubber composition) during its formative extrusion to form a tread strip and to thereby subsequently minimize its base peaking into the uncured outer tread cap rubber layer of a substantially different T+5 cure rate was observed to be an advantage in a sense of not requiring appreciable increased processing difficulty during the aforesaid extrusion of the rubber composition to form the shaped, partially pre-cured, tread layer strip.

It is envisioned that, in contrast, other potential methods which might be considered for increasing the rubber viscosity to minimize the aforesaid reducing base peaking involving use of increased reinforcing filler (e.g. carbon black) contents or addition of higher softening point resins would promote rubber processing challenges that would increase the rubber viscosity at an expense of increased hysteresis of the rubber composition, to result in additional internal heat buildup with an accompanying temperature rise of the rubber composition composite of outer tread cap rubber layer and underlying tread rubber layer which would be expected to result in poorer rolling resistance (greater resistance to rolling of the tire) for the tire itself and reduction of fuel economy for the associated vehicle.

In the practice of this invention, the elastomers of the outer tread cap rubber composition of the outer tread rubber layer may be comprised of at least one rubber comprised of polymers and copolymers of at least one of isoprene and 1,3-butadiene and copolymers of styrene and at least one of isoprene and 1,3-butadiene. Exemplary of such elastomers are, for example, natural and synthetic cis 1,4-polyisoprene rubber, cis 1,4-polyisoprene rubber, 3,4-polyisoprene rubber, styrene/butadiene copolymer rubbers, isoprene/butadiene rubbers, styrene/isoprene/butadiene terpolymer rubbers, and cis 1,4-polybutadiene rubber.

BRIEF DESCRIPTION OF ACCOMPANYING DRAWINGS

Drawings are provided for further understanding of the invention in a form of FIGS. 1 through 4 (FIGS. 1 through 4).

The Drawings are presented as being informative in a sense that the invention is not limited to the drawing which is presented here for illustrative purposes.

THE DRAWINGS

Figure 1:
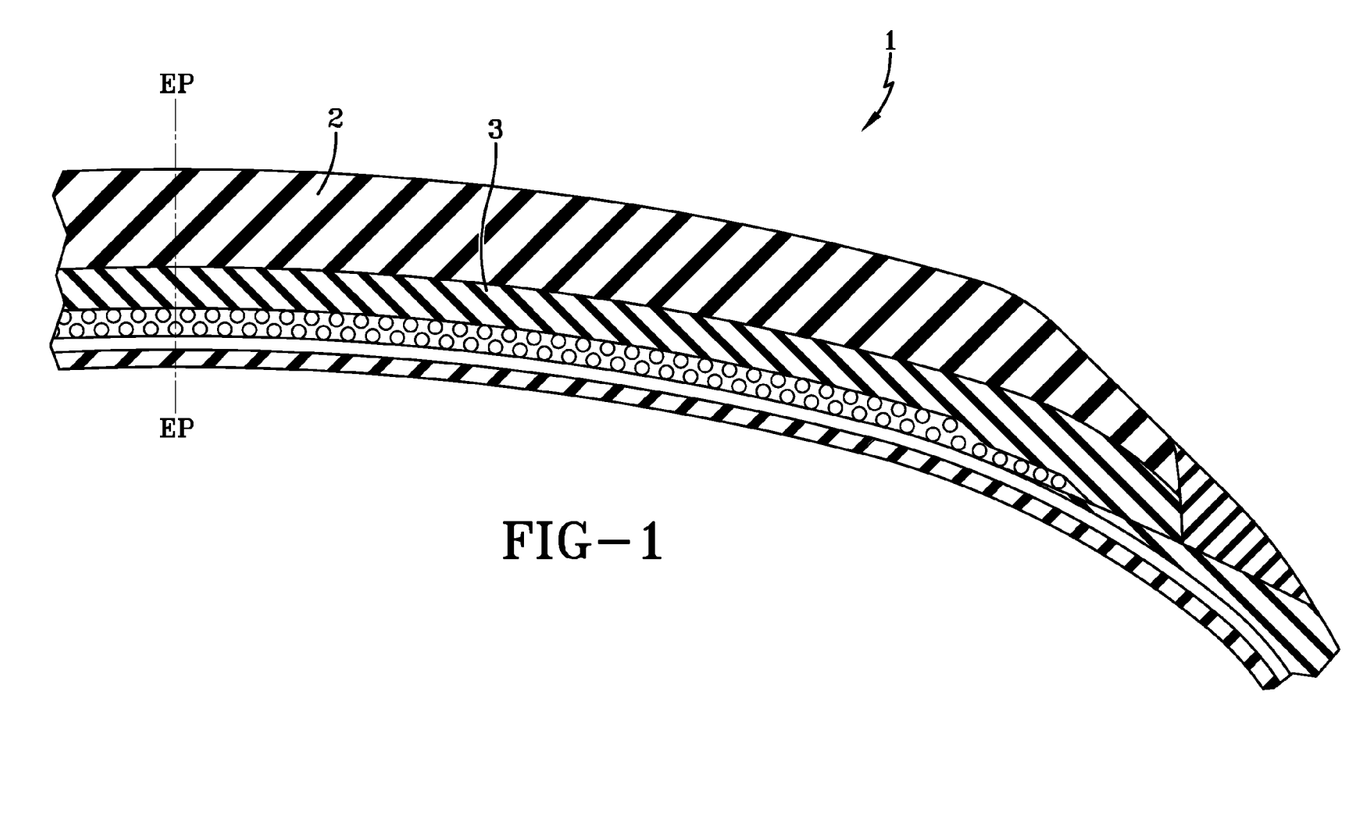
FIGS. 1 through 3 depict a cross section of a tire tread of a cap/base construction.

FIG. 1 illustrates a cross-section of an unvulcanized (uncured) tire tread (1), with a centerline, or equatorial plane, (EP), of a cap/base construction with an outer tread cap rubber layer (2) and underlying tread base rubber layer (3) prior to being positioned in a mold and submitted to conditions of elevated temperature and pressure within the mold for a purpose of shaping and vulcanizing the tread rubber.

It is readily seen that the unvulcanized underlying tread base rubber layer (3) does not extend into the unvulcanized outer tread cap rubber layer (2).

Figure 2:
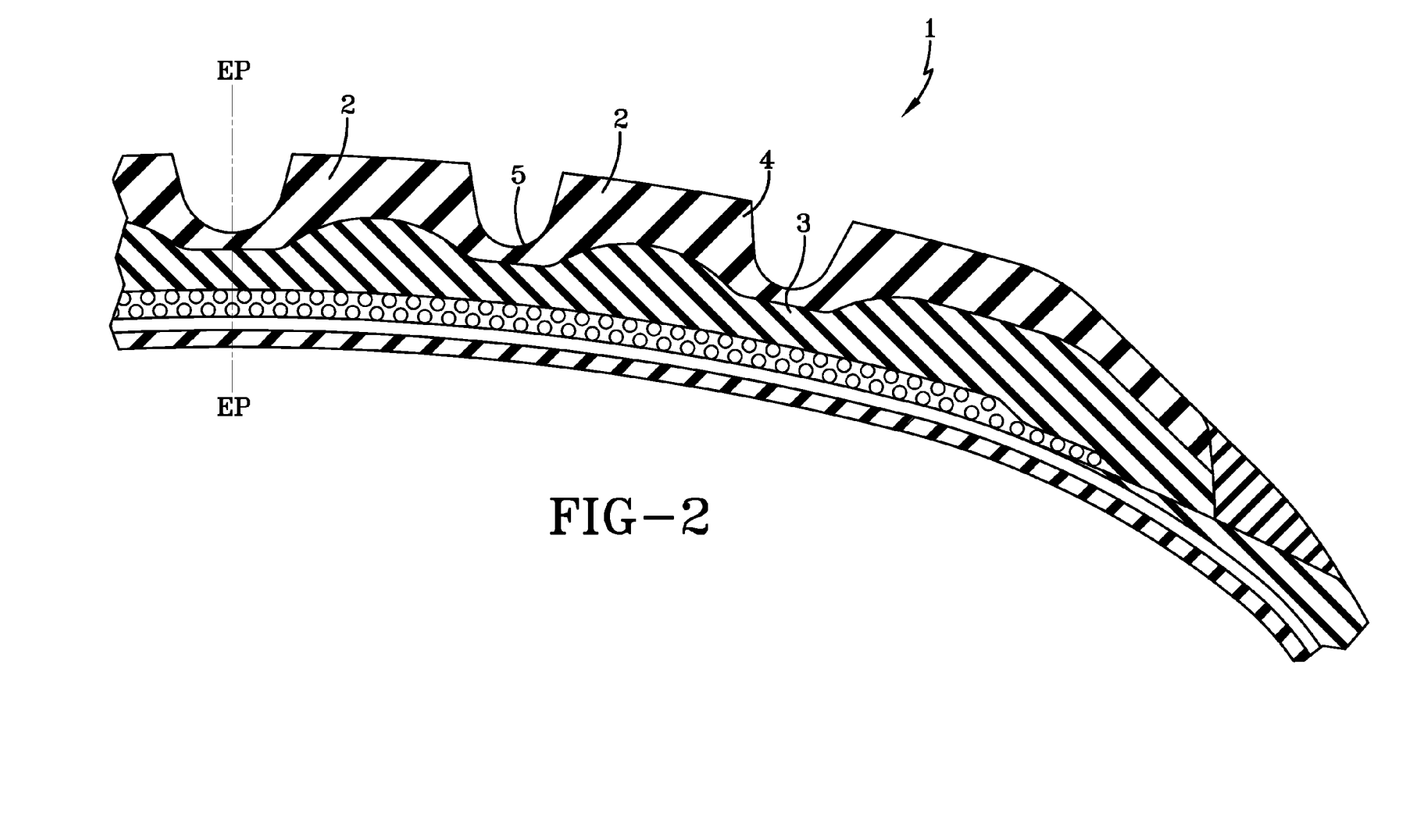

FIG. 2 illustrates a cross-section of a vulcanized (cured), shaped tire tread (1) of cap/base construction with an outer tread cap rubber layer (2) of a molded lug (4) and groove (5) construction together with an underlying tread base rubber layer (3) significantly extending into the lugs (4) of the outer tread cap rubber layer (2).

It is readily seen that the underlying tread base rubber layer (3) extends into the lugs (4) of the outer tread cap rubber layer (2) which is caused by the flow of the tread rubber for both of the outer tread cap rubber layer (2) and underlying base rubber layer (3) flowing together upon having the tread molded and shaped in a tire mold under conditions of elevated temperature and pressure. This effect of the underlying rubber layer (3) extending into the lugs (4) of the outer tread cap rubber layer (2) caused by the flow of the rubber during the aforesaid molding process is referred to as "base peaking"

Figure 3:
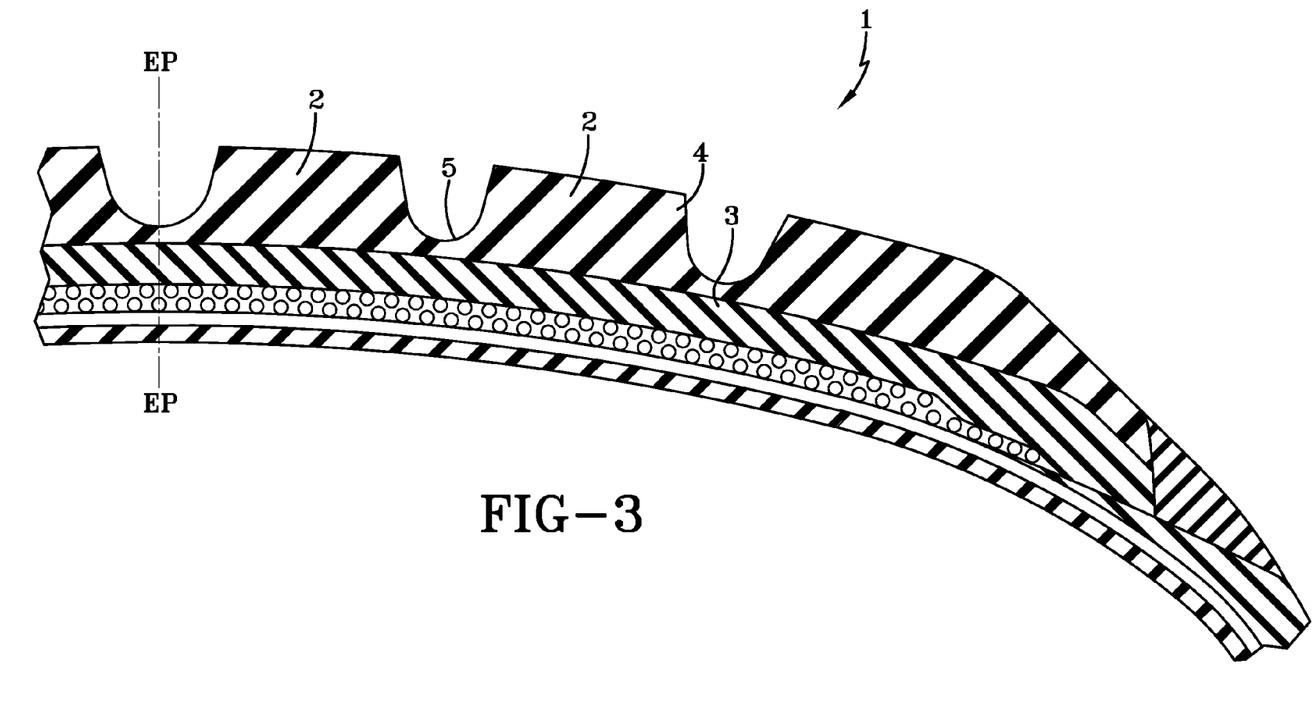

FIG. 3 illustrates this invention in a sense of depicting a cross-section of a vulcanized (cured), shaped tire tread (1) of cap/base construction with an outer tread cap rubber layer (2) of a molded lug (4) and groove (5) construction together with an underlying tread base rubber layer (3) adjacent to (next to, or juxtapositioned to) the outer tread cap rubber layer (2).

It is readily seen that the underlying vulcanized (cured) tread base rubber layer (3) does not significantly extend into the lugs (4) of the outer tread cap rubber layer (2) after the flow of the tread rubber being molded and shaped in a tire mold under conditions of elevated temperature and pressure.

Accordingly, this FIG. 3 shows a lack of "base peaking" and is intended to illustrate a practice of this invention. In particular, this FIG. 3 is presented to illustrate an effect of providing the underlying tread base rubber layer (3) as an uncured rubber layer of a rubber composition characterized by having a time for a T+5 Mooney viscosity unit rise of 5 Mooney viscosity units of from about 5 to about 20 minutes at a temperature of 121° C. and at least 5 minutes less than time for the T+5 Mooney viscosity unit rise for the uncured rubber composition for the outer tread cap rubber layer (2).

Figure 4:
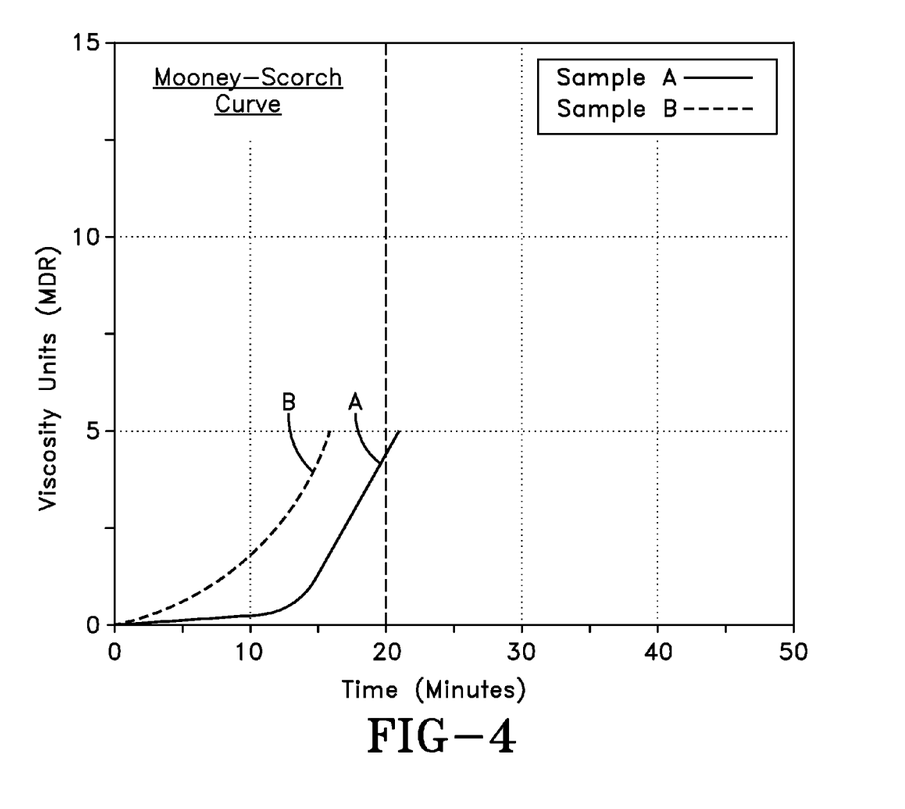
FIG. 4 is a graphical plot of viscosity (y axis) versus time in minutes (x axis) for what is referred to herein as a Mooney viscosity-scorch curve.

FIG. 4 is a graphical plot of visualized viscosity versus time for a Mooney viscosity scorch curve for T+5 viscosities for relatively scorchy Experimental rubber Sample B of the Example herein as being 15.6 minutes and for non scorchy Control rubber Sample A of the Example herein as being 21.4 minutes.

In practice, it is readily understood by those having skill in the art that the rubber compositions of the outer tread cap layer and underlying rubber layer would be compounded by methods generally known in the rubber compounding art, such as mixing the various sulfur-vulcanizable constituent rubbers with various commonly used additive materials such as the indicated and described curing aids as well as processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical additions of carbon black comprise, for example, about 20 to 100 parts by weight of diene rubber (phr), preferably 30 to 60 phr. Typical amounts of tackifier resins, if used, comprise about 0.5 to about 10 phr, usually about 1 to about 5 phr. Typical amounts of processing aids comprise 1 to 20 phr. Such processing aids can include, for example, aromatic, napthenic, and/or paraffinic processing oils. Silica, if used, may be used in various amounts, usually with a silica coupling agent. Representative silicas may be, for example, hydrated amorphous silicas. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.25 being preferred.

Sulfur cure accelerators for use with the rubber composition for the underlying tread rubber layer as well as organoperoxides to control the T+5 time for Mooney viscosity build up have hereinbefore been discussed.

The tire can be built, shaped, molded and cured by various methods which will be readily apparent to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE I

Mixtures of diene rubbers and sulfur cure promoters were prepared for evaluation, particularly for their time to reach a T+5 Mooney viscosity value increase.

The basic rubber composition used is summarized in Table 1.

TABLE 1

|  | Parts |
|---|---|
| Non-Productive Mixing (NP-1) | |
| Natural cis 1,4-polyisoprene rubber[1] | 26 |
| Cis 1,4-polybutadiene rubber[2] | 37 |
| Isoprene/butadiene copolymer rubber[3] | 37 |
| Carbon black[4] | 56 |
| Antidegradant | 3 |
| Zinc oxide | 5 |
| Fatty acid[5] | 0.5 |
| Productive Mixing (PR) | |
| Sulfur | 3.2 |
| Antidegradant | 1 |
| Primary sulfur cure accelerator[6] | 6.6 |
| Sulfur cure promoter (donor)[7] | 5.5 |
| Sulfur cure retarder[8] | 0 or 0.3 |

[1]Natural cis 1,4-polyisoprene rubber as SMR20, a natural rubber designation
[2]As BUD 1207 ™ from The Goodyear Tire & Rubber Company.
[3]As an isoprene/butadiene copolymer elastomer from The Goodyear Tire & Rubber Company having an isoprene/butadiene ratio of about 30/70.
[4]N550, rubber reinforcing carbon black, an ASTM designation
[5]Comprised of stearic acid and palmitic acid and a small amount of oleic acid
[6]Dicyclohexylbenzothiazole sulfenamide
[7]Alkylphenoldisulfide
[8]N-cyclohexylthiophthalimide The following Table 2 illustrates cure behavior and various physical properties of rubber Samples A and B, where rubber Sample A is a Control rubber Sample. Where a cured rubber sample was evaluated, such as for the stress-strain, rebound, hardness, tear strength and abrasion measurements, the rubber sample was cured for example, about 14 minutes at a temperature of about 160° C.

TABLE 2

|  | Rubber Samples (phr) | |
|---|---|---|
|  | Control A | Experimental B |
| Primary sulfur cure accelerator | 6.6 | 6.6 |
| Sulfur cure promoter (donor) | 5.5 | 5.5 |
| Sulfur cure retarder | 0.3 | 0 |
| Mooney Scorch Time[1] (120° C.) | | |
| T + 5 (minutes) | 21.4 | 15.6 |
| Rheometer, 150° C. (MDR)[2] | | |
| Maximum torque (dNm) | 2.8 | 2.9 |
| Minimum torque (dNm) | 42.8 | 43.3 |
| Delta torque (dNm) | 40 | 40.4 |
| $T_{90}$, minutes | 12.6 | 11.6 |
| Time for 1 point viscosity rise (minutes) | 3.2 | 2.6 |
| Stress-strain (ATS)[3] | | |
| Tensile strength (MPa) | 12.6 | 11.7 |
| Elongation at break (%) | 172 | 170 |
| 100% modulus, ring (MPa) | 6.4 | 6 |
| Rebound, 100° C. | 81.4 | 80.7 |
| Hardness (Shore A), 100° C. | 77 | 75.9 |

[1]Mooney Scorch (T + 5) time as minutes for a Mooney viscosity increase of 5 viscosity units at 120° C.
[2]Data according to Automated Testing System instrument by the Instron Corporation which incorporates six tests in one system. Such instrument may determine ultimate tensile, ultimate elongation, modulii, etc.
[3]Stress-strain physical properties such as Tensile strength, Elongation at break and 300 percent Modulus (ring) values.

From Table 2 it can be seen that the goal of providing a relatively scorchy rubber composition which might be considered for an underlying tread rubber layer of this invention with a time for a T+5 Mooney viscosity value rise of 5 viscosity units in less than 20 minutes at 121° C., namely 15.6 minutes reported in Table 2, illustrated in FIG. 4 herein, for Experimental rubber Sample B, was achieved without significantly affecting its cured properties as compared to Control rubber Sample A.

Further, the time for a T+5 Mooney viscosity value for Experimental rubber Sample B of 15.6 minutes was at least 5 minutes less than the T+5 Mooney viscosity value rise of 5 viscosity units for non-scorchy Control rubber Sample A of 21.4 minutes, namely a difference of 5.8 minutes, as reported in Table 2 and illustrated in FIG. 4 herein.

While certain representative embodiments and details have been shown for the purpose of illustrating the invention, it will be apparent to those skilled in this art that various changes and modifications may be made therein without departing from the spirit or scope of the invention.

What is claimed is:

1. A method which comprises applying a tread rubber strip as a circumferential tread component of a tire assembly comprised of a plurality of uncured rubber components wherein said tread rubber strip is a co-extruded laminate comprised of two rubber layers, wherein said rubber layers are comprised of a first uncured rubber layer as an outer rubber tread layer and a second partially cured rubber layer as underlying tread rubber layer wherein said underlying tread rubber layer underlies said first uncured rubber layer, wherein said tire assembly is then molded in a suitable tire mold at an elevated temperature and pressure to form a cured rubber tire with a cured rubber tread with its outer tread rubber layer having a molded lug and groove configuration and where said tread has a minimized base peaking of said underlying tread rubber layer into and within the lugs of the outer tread rubber layer;

wherein said second rubber layer of said tread strip is comprised of a rubber composition characterized in its uncured state by having a time for its T+5 Mooney viscosity rise property at 121° C. in a range of from about 5 to about 20 minutes;

wherein said first rubber layer of said tread strip is comprised of a rubber composition characterized in its uncured state by having a time for its T+5 Mooney viscosity rise property at 121° C. in a range of from about 20 to about 60 minutes;

wherein the time for said T+5 Mooney viscosity rise property of said second rubber composition is at least 5 minutes less than the time for said T+5 Mooney viscosity rise property of said first rubber composition.

2. The method of claim 1 wherein said rubber tread strip is prepared by a method which comprises simultaneously co-extruding rubber compositions comprised of first and second uncured rubber compositions through a die to form a co-extruded laminate comprised of two rubber layers comprised of said first rubber composition as an uncured tire tread outer rubber layer and said second rubber composition as a partially cured tire tread underlying rubber layer where said underlying rubber layer underlies said tire tread outer rubber layer;

wherein said second rubber composition becomes partially cured during said co-extrusion process;

wherein said uncured second rubber composition is characterized by having a time for its T+5 Mooney viscosity rise property at 121° C. in a range of from about 5 to about 20 minutes;

wherein said uncured first rubber composition is characterized by having a time for its T+5 Mooney viscosity rise property at 121° C. in a range of from about 20 to about 60 minutes, and;

wherein the time for said T+5 Mooney viscosity rise property of said uncured second rubber composition is at least 5 minutes less than the time for said T+5 Mooney viscosity rise property of said first rubber composition.

3. The method of claim 2 wherein said rubber compositions are extruded at a temperature in a range of from about 90 to about 130° C.

4. The method of claim 2 which further comprises applying said co-extruded tread rubber strip as a circumferential tread component of a tire assembly comprised of a plurality of uncured rubber components and the assembly then molded in a suitable tire mold at an elevated temperature and pressure to form a cured rubber tire having a cured rubber tread with its outer tread rubber layer having a molded lug and groove configuration and where said tread has a minimized base peaking of said underlying tread rubber layer into and within the lugs of the outer tread rubber layer.

5. A method comprised of placing said tire of claim 4 into a suitable tire curing mold:
(A) to cause said uncured outer tread cap rubber layer to flow into cavities in said mold and thereby provide said outer tread cap rubber layer with a lug and groove configuration,
(B) to cause said uncured outer tread cap rubber layer and partially pre-cured underlying tread base rubber layer to cure together within said mold at an elevated temperature to form an integral tread composite thereof,
wherein base peaking of said underlying tread base rubber layer into the said lugs of said outer tread rubber layer is minimized by its said T+5 Mooney viscosity property.

6. A tire prepared by the method of claim 5.

7. The tire of claim 6 wherein the rubber composition of said underlying tread rubber layer is comprised of, based on parts by weight ingredient per 100 parts by weight rubber (phr),
(A) 100 phr of at least one conjugated diene-based elastomer, exclusive of trans 1,4-polybutadiene polymers, trans 1,4-polyisoprene polymers and isobutylene-based copolymers,
(B) sulfur vulcanization system comprised of:
(1) sulfur,
(2) primary sulfur vulcanization accelerator,
(3) optionally a secondary sulfur vulcanization accelerator, and
(4) optionally exclusive of a sulfur vulcanization retarder.

8. A tire prepared by the method of claim 4.

9. The tire of claim 8 wherein the rubber composition of said underlying tread rubber layer is comprised of, based on parts by weight ingredient per 100 parts by weight rubber (phr),
(A) 100 phr of at least one conjugated diene-based elastomer, exclusive of trans 1,4-polybutadiene polymers, trans 1,4-polyisoprene polymers and isobutylene-based copolymers,
(B) sulfur vulcanization system comprised of:
(1) sulfur,
(2) primary sulfur vulcanization accelerator,
(3) optionally a secondary sulfur vulcanization accelerator, and
(4) optionally exclusive of a sulfur vulcanization retarder.

10. The tire of claim 8 wherein said sulfur vulcanization system further comprises a secondary sulfur vulcanization accelerator.

11. The tire of claim 8 wherein said sulfur accelerated vulcanization system is exclusive of a sulfur vulcanization retarder.

12. The tire of claim 8 wherein said rubber composition of said underlying tread base rubber layer further contains a crosslinking agent comprised of at least one of:
(A) metaphenylenebismaleimide, and
(B) organoperoxide, wherein said organoperoxide is comprised of at least one of dicumyl peroxide, n-butyl 4,4-di-(tert-butylperoxy) valerate, 2,5-bis(t-butyl peroxy)-2,5-dimethyl hexane, 1,1-di-t-butyl peroxy-3,3,5-trimethyl cyclohexane, 2,5-dimethyl-2,5-di(t-butyl peroxy)hexane-3, p-chlorobenzyl peroxide, 2,4-dichlorobenzyl peroxide, 2,2-bis-(t-butyl peroxy)-butane, di-t-butyl peroxide, and benzyl peroxide.

13. The tire of claim 8 wherein said rubber composition of said underlying tread rubber layer further contains a resin comprised of an in situ reaction product of a methylene donor and methylene acceptor, wherein said methylene donor is comprised of at least one of hexamethoxymethylmelamine, hexaethoxymethylmelamine, ethoxymethylpyridinium chloride, N,N'N"-trimethylolmelamine, N-methylolmelamine, N',N"-dimethylolmelamine and hexamethylenetetramine and said methylene acceptor compound is comprised of at least one of resorcinol, resorcinol monobenzoate, phenolic cashew nut shell oil resin and polyhydric phenoxy resin.

14. The tire of claim 8 wherein said primary sulfur cure accelerator is comprised of at least one of cyclohexylbenzothiazole sulfenamide, dicyclohexylbenzothiazole sulfenamide and N-tert-butyl-2-benzothiazolesulfenamide, and wherein said secondary sulfur cure accelerator is comprised of at least one of tetramethyl thiuram disulfide, tetramethyl thiuram monosulfide, zinc dimethyldithiocarbamate, tetraisobutyl thiuram disulfide, tetraisobutyl thiuram monosulfide, tetrabenzyl thiuram disulfide, zinc dibenzyldithiocarbamate, diphenylguanidine, and di-o-tolyguanidine.

15. The tire of claim 8 wherein said sulfur is provided by a sulfur donor or combination of sulfur donor and sulfur, wherein said sulfur donor releases free sulfur at an elevated temperature and is comprised of at least one of alkylphenoldisulfide and 4,4'-dithiodimorpholine.

16. The tire of claim 8 wherein said sulfur cure retarder excluded from said sulfur cure system is comprised of at least one of N-cyclohexyl thiophthalimide and phthalic anhydride.

* * * * *